4 Sheets--Sheet 3.
H. C. HART & M. R. St. J. DILLON-LEE.
Fire-Extinguisher.
No. 167,664. Patented Sept. 14, 1875.
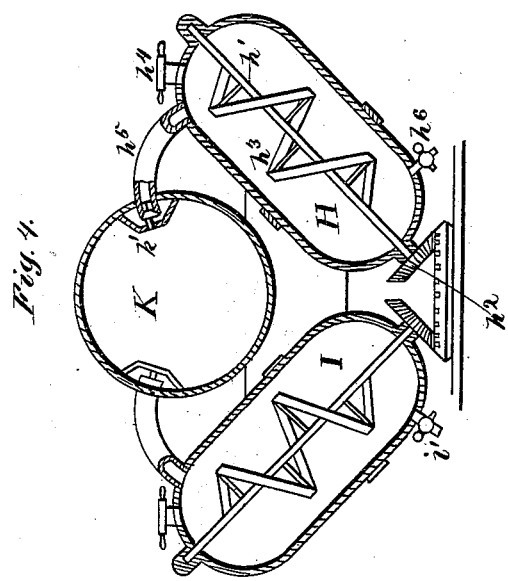
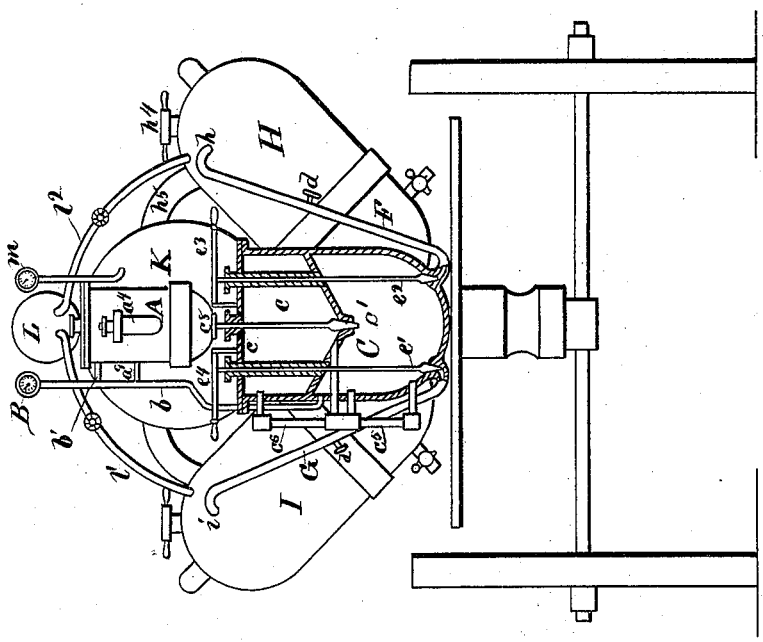
Witnesses:
Jas. F. Duhamel
Thomas Byrne
Inventors:
H. C. Hart.
M. R. St. J. Dillon-Lee.
Per H. S. Hart.
Attorney.

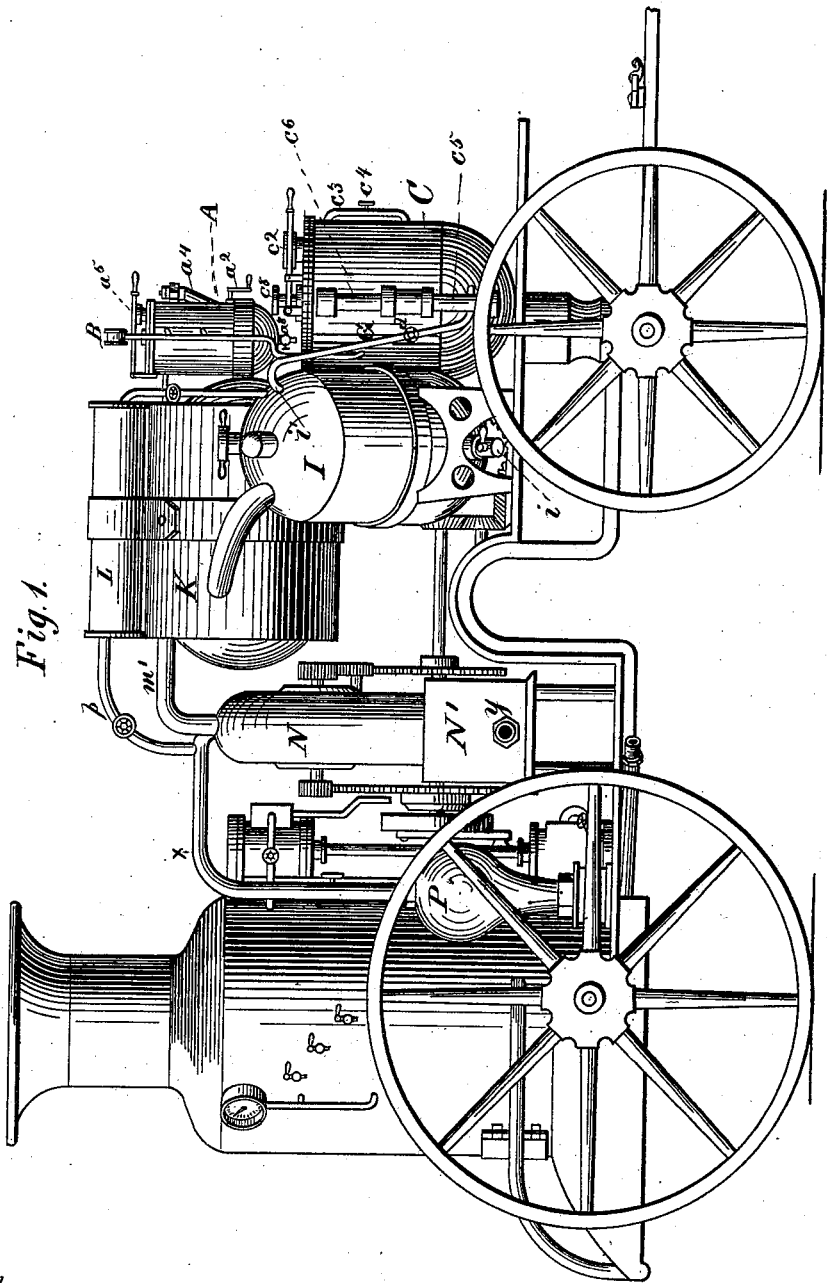

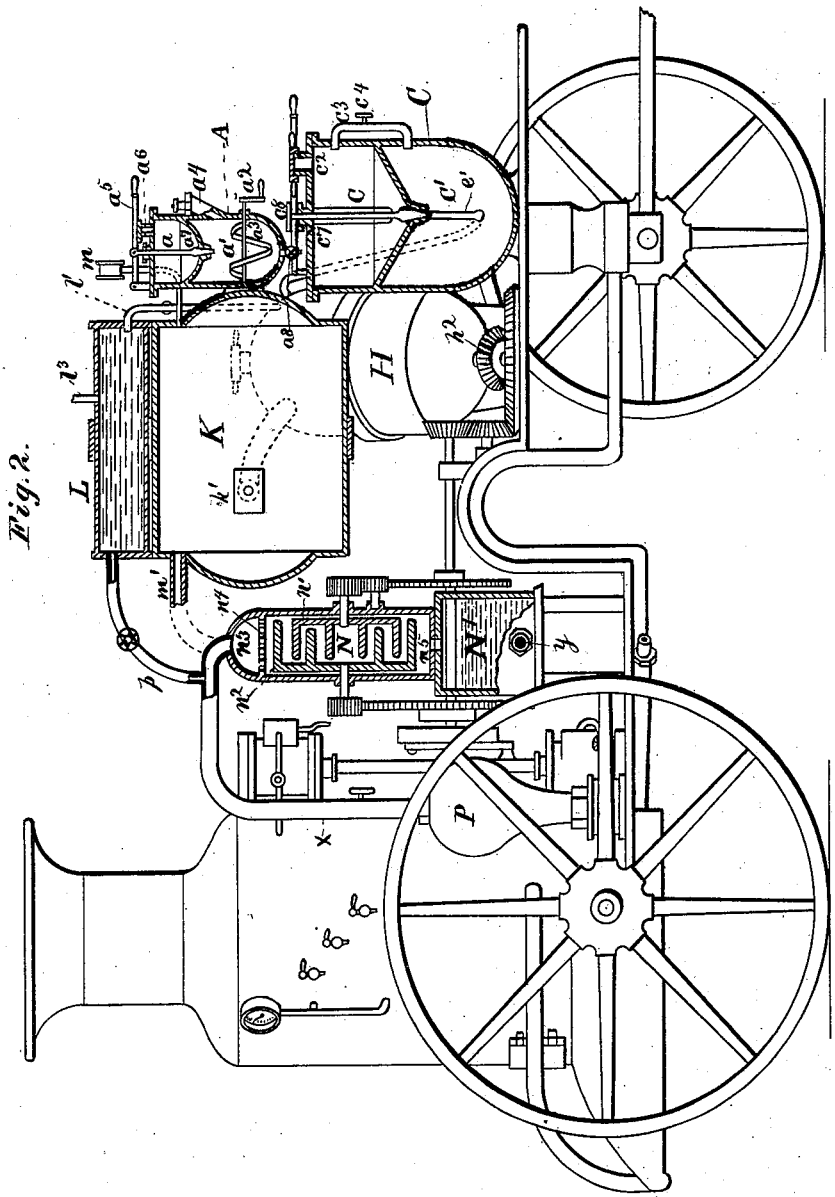

4 Sheets--Sheet 4.
H. C. HART & M. R. St. J. DILLON-LEE.
Fire-Extinguisher.
No. 167,664. Patented Sept. 14, 1875.
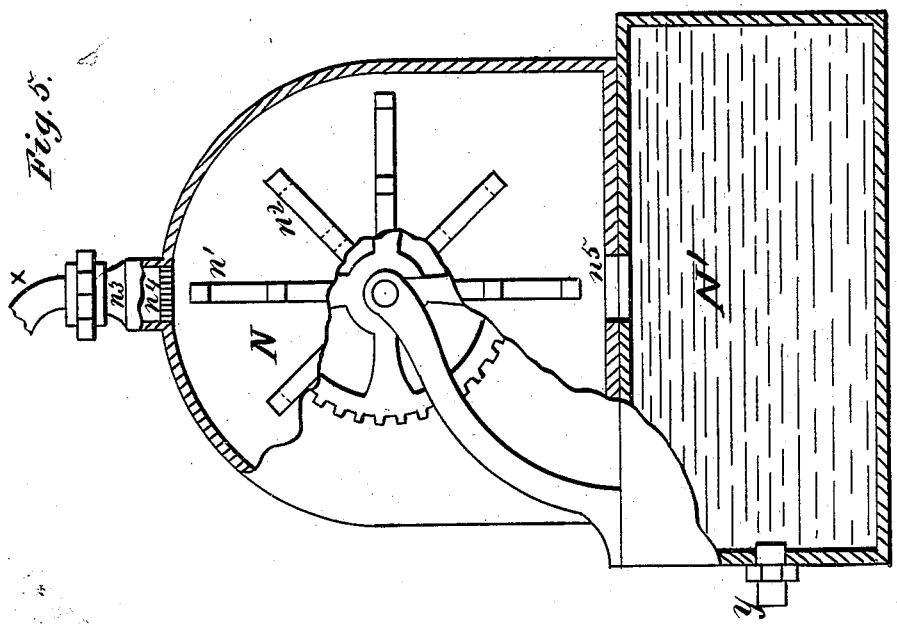
Witnesses:
Jas. F Duhamel.
Thomas Byrne,
Inventors:
H. C. Hart.
M. R. St. J. Dillon-Lee
Per H. C. Hart.
Attorney.

UNITED STATES PATENT OFFICE.

HENRY C. HART AND MARMADUKE R. ST. J. DILLON-LEE, OF ADRIAN, MICH.

IMPROVEMENT IN FIRE-EXTINGUISHERS.

Specification forming part of Letters Patent No. 167,664, dated September 14, 1875; application filed December 28, 1874.

*To all whom it may concern:*

Be it known that we, H. C. HART and M. R. ST. J. DILLON-LEE, of Adrian, county of Lenawee and State of Michigan, have invented certain new and useful Improvements in Fire-Extinguishers, of which the following is a specification:

The object of our invention is to throw a stream of water for any length of time from any ordinary water-supply that is highly impregnated with carbonic-acid gas, and not holding in solution any of the ingredients used in generating the gas; and to this end the nature of our invention consists principally in the construction and arrangement of an apparatus for generating a large amount of carbonic-acid gas in a short time, and generating it just as fast as it is used, and no faster, automatically, no matter how much is used, and in a device for thoroughly mixing the gas and the water together. The water, which is the vehicle of conveying the gas, is taken up by a steam-pump from a cistern, reservoir, or fire-plug, and forced into a tight drum called the agitator. In said drum it comes in contact with two or more paddles rotating at a high rate of speed in opposite directions. In this agitator the water is thus rendered into fine spray, being brought into contact with a high pressure of carbonic-acid gas, the force of which gas also expels the water from the chamber directly below the agitator through the hose, all as hereinafter more fully set forth.

In order to enable others skilled in the art to which our invention appertains to make and use the same, we will now proceed to describe its construction and operation, referring to the annexed drawings, which form a part of this specification, and in which—

Figure 1 is a side elevation of our machine. Fig. 2 is a longitudinal section of the same. Fig. 3 is a cross-section through the center of the acid-tank. Fig. 4 is a cross-section through the gasometer and generators. Fig. 5 is an enlarged cross-section of the agitator.

A represents a carbonic-acid-gas generator, composed of an acid-chamber, $a$, and a lower chamber, $a^1$, for containing the carbonate. The acid-chamber $a$ is filled at the opening $a^6$, which is closed by a tight-fitting cap. The carbonate-chamber $a^1$ is filled by a similar aperture, $a^4$, and closed in like manner, and on this cap is a small safety-valve, as shown. On top of the generator A is a lever, $a^5$, which operates the valve $a^7$ to admit the sulphuric acid from the chamber $a$ to the carbonate-chamber $a^1$. In the carbonate-chamber $a^1$ is a paddle, $a^3$, operated by a crank, $a^2$, for agitating the carbonate mixture. At the bottom of this generator is a stop-cock, $a^8$, for blowing off the mixture when its chemical capacity is exhausted. The generator $a$ is connected through a connection, $a^9$, with a pipe, $b$, which pipe, at the upper end, leads into the pressure-gage B, and at the lower end it connects with the main acid-tank C of the machine. The connection $a^9$ leads from the chamber $a^1$ into the pipe $b$, and another connection, $b'$, leads into said pipe from the acid-chamber $a$, whereby the pressure is equalized in both chambers of said generator A. The object of the generator A is to regulate the pressure in the machine, and keep it at very nearly the same point, as will be hereinafter described. The acid-tank C is composed of an upper chamber, $c$, and a lower chamber, $c^1$, whereby the operator is enabled to fill the upper chamber while using acid from the lower, and thereby overcoming the necessity of stopping the machine should a fresh supply of acid be needed. The upper chamber $c$ is filled at an opening, $c^2$, on top, which opening is closed by a suitable cap. The lower chamber $c^1$ is filled by raising the valve $c^7$, which is operated by a hand-wheel, $c^8$, at its upper end. These acid-chambers have an equalizing-pipe, $c^3$, with a stop-cock, $c^4$, to shut off the pressure when it is necessary to fill the upper chamber with acid. Both the chambers are provided with separate glass gages $c^5$ and $c^6$ to indicate the supply of acid in them respectively.

The acid-tank C is provided with two valves, $e^1 e^2$, manipulated by means of their respective handles $e^3$ and $e^4$, to admit acid into either pipe F or G, as may be desired. These pipes F G are provided with cocks or valves $d$, and lead, respectively, to the main generators I and H, opening into the same at the points $i$ and $h$. The gas-generators H and I are precisely alike in all particulars, the object of having two generators in one machine being to avoid the necessity of stopping the flow of gas when it becomes necessary to recharge either of them. The generator H is set at an angle of about forty-five degrees, and is provided with a shaft, $h^1$, provided at its lower end with a gear-wheel, $h^2$. On this shaft is a screw-paddle, $h^3$, for the purpose of agitating the carbonate mixture. This generator is filled at the opening $h^4$ with bicarbonate of soda and water, and closed with a suitable cap. A pipe, $h^5$, leads from the generator into the gasometer K, said pipe being provided with a valve, $k'$, at its entrance into the gasometer. The generator I is provided with a similar pipe and valve. It is obvious that when pressure is obtained in the generator H the valve $k'$ is raised, and the corresponding valve leading from the generator I will be closed, entirely disconnecting the same from the remainder of the machine, allowing it to be cleaned out and recharged. The same will take place under similar circumstances with the generator H. Both of the generators are provided with blow-off cocks $h^6$ and $i'$ for removing their contents when worthless for use.

On top of or back of the gasometer K is a tank, L, which can at any time be filled from a pump, P, through the pipe $p$; and its contents can at any time be discharged into either generator by the use of the discharge-pipes $l^1$ $l^2$. This water-tank is provided with an overflow-pipe, $l^3$, to indicate when it is full. The capacity of the tank L should be equal to the amount of water used in charging a generator.

The gasometer K is designed to hold the supply of gas created by the operating generator, and it is used in order that the generators may be made as small as possible. By the use of the gasometer the generators can be filled with a far larger quantity of carbonate solution than would otherwise be practicable, little or no space being required in the generators for accumulating gas. The gasometer is provided with a pressure-gage, $m$, which should at all times indicate the same pressure as the gage B, but by its use will show any derangement of the working of the generators.

Leading from the gasometer is a pipe, $m^1$, which supplies gas to the agitator N. This agitator is for the purpose of thoroughly impregnating the water with the carbonic-acid gas generated in the parts of the machine above described. It is divided into two parts, the agitator proper N and the water-chamber N'. In the part N are paddles $n^1$ $n^2$, to be revolved at high speed in opposite directions. The water being pumped by the pump P through the pipe $x$ into aperture $n^3$, passes through a perforated plate or screen, $n^4$, and is beaten to a fine spray by the paddles $n^1$ $n^2$, and in this condition comes into contact with carbonic-acid gas at high pressure. Every particle of water being thus separately exposed to the pressure of the gas, the stream constantly passing through the agitator is instantly impregnated in its passage. The water passes from the agitator N through the opening $n^5$ into the water-chamber N', and from thence it is thrown through the hose $y$ upon the fire.

The boiler, engine, and pump used may be of any suitable construction, and the paddles of the agitator, as well as the shafts of the generators, may be revolved by any suitable means.

The whole machine, engine, boiler, and pump, together with the gas-generating apparatus, will be mounted on a suitable carriage or truck.

The operation of the machine is as follows: The small generator A, having its acid-chamber $a$ filled with sulphuric acid, and its carbonate chamber $a^1$ filled with a solution of bicarbonate of soda and water, the main acid-tank having both its chambers filled with sulphuric acid, the generators H and I being supplied with the requisite amount of soda solution, steam being raised, and the suction-pipe placed in the water, the machine is ready to operate.

By raising the lever $a^5$ on the small generator A, a small quantity of acid is admitted to the soda solution below, which, by its chemical combination, generates carbonic-acid gas and creates a pressure throughout said small generator A, the pipe $b$, and the main acid-tank C, the amount of which pressure is indicated at the gage B. If too much pressure is created, it is relieved by the safety-valve on the cap $a^4$. This pressure being communicated through pipe $b$ to the acid-tank C, passes into the lower chamber $c^1$ first, and into the upper chamber $c$, through the equalizing-pipe $c^3$, the stop-cock $c^4$ of which should be open. This stop-cock is only closed while filling the upper chamber with acid.

The pressure on the acid in the lower chamber forces it past the cock or valve $d$ in either pipe F or G, according as either valve $e^1$ or $e^2$ is opened, and thus the acid is forced into its corresponding generator H or I. The acid, coming into contact with the carbonate in the generator in use, generates gas which creates pressure.

It is obvious that so long as the pressure in the acid-chamber $c^1$ is greater than in the generator in use the acid will continue to flow into that generator, but as soon as the pressure in the generator is equal to the pressure in the acid-chamber, the acid will cease to flow. As fast as the gas is used and the pressure in the generator lessened the acid will flow over from the acid-chamber, and thus maintain a constant pressure in the generator and in the gasometer K, with which it is connected, equal to the pressure in the small generator A. The gas in this small generator being used only to create a pressure in that generator and in the acid-tank, and not being consumed, will maintain nearly the same pressure for a long time, and, consequently, the pressure throughout the whole machine will be sustained at nearly the same point automatically.

Instead of using paddles to convert the water into fine spray, this may be accomplished in various other ways; hence we do not confine ourselves to the use of paddles for this purpose.

Having thus fully described our invention, what we claim as new, and desire to secure by Letters Patent, is—

1. In chemical fire-extinguishers, containing an acid-tank and one or more generators, an auxiliary generator for generating gas to force the acid into the main generator, substantially as herein set forth.

2. The acid-tank C divided into two chambers, $c\ c^1$, and provided with the valve $c^7$, connecting-pipe $c^3$ having cock $c^4$, and glass gages $c^5\ c^6$, substantially as and for the purposes herein set forth.

3. The generator A, having chamber $a$ for the acid, and chamber $a^1$ for the carbonate, in combination with the acid-tank C and the generators H and I, the acid-tank being connected with the generators H and I by the pipes F and G, substantially as and for the purpose set forth.

4. In a chemical fire-extinguisher, the method of impregnating the water with carbonic-acid gas, by converting the water to a fine spray, and, while in that condition, allowing it to come in contact with the gas under pressure, substantially as herein set forth.

5. The agitator N, provided with paddles revolving in opposite directions, in combination with an apparatus for supplying gas thereto, and with a water-supply, substantially as and for the purpose set forth.

6. The combination of the generator A and acid-tank C with the generators H and I at an angle of about forty-five degrees, and the gasometer K, with their respective connections, substantially as described.

7. A fire-extinguisher provided with an agitator having means for the admission of water and gas separately preparatory to charging the water with the gas, substantially as described.

8. The combination of a steam-pump, a gas-generating apparatus, and an agitator, all connected to a suitable frame-work and mounted on a truck, substantially as herein set forth.

In testimony that we claim the foregoing as our invention we hereunto affix our signatures.

HENRY C. HART.

MARMADUKE R. ST. JAS. DILLON-LEE.

Witnesses:
CHAS. M. WALKER,
HARRY WEBSTER.